(12) United States Patent
Humphrey

(10) Patent No.: US 6,666,434 B2
(45) Date of Patent: Dec. 23, 2003

(54) UNDERGROUND CABLE RETRIEVAL TOOL

(75) Inventor: Martin A. Humphrey, Byron, GA (US)

(73) Assignee: Arlen K. Bean, Reno, NV (US)

( * ) Notice: Subject to any disclaimer, the term of this patent is extended or adjusted under 35 U.S.C. 154(b) by 0 days.

(21) Appl. No.: 10/385,446

(22) Filed: Mar. 12, 2003

(65) Prior Publication Data

US 2003/0183813 A1 Oct. 2, 2003

Related U.S. Application Data

(60) Provisional application No. 60/369,427, filed on Apr. 1, 2002.

(51) Int. Cl.[7] ................................................ E21C 29/16
(52) U.S. Cl. ..................... 254/134.3 FT; 254/134.3 PA; 254/134.3 R
(58) Field of Search ............................... 254/134.3 FT, 254/134.3 PA, 134.3 R, 291–292; 242/86.5, 86.7; 91/520, 449

(56) References Cited

U.S. PATENT DOCUMENTS

| | | | | |
|---|---|---|---|---|
| 4,576,362 A | * | 3/1986 | Langston | ............ 254/134.3 FT |
| 4,684,161 A | * | 8/1987 | Egner et al. | .................. 294/1.1 |
| 4,840,352 A | * | 6/1989 | Ellis | ........................ 254/134.4 |
| 4,848,734 A | * | 7/1989 | Ford | ........................ 254/134.4 |
| D386,052 S | * | 11/1997 | Nasir | ........................... D8/14 |
| 6,109,829 A | * | 8/2000 | Cruickshank | ............... 405/169 |

* cited by examiner

Primary Examiner—Joseph J. Hail, III
Assistant Examiner—Daniel Shanley

(57) ABSTRACT

A method and apparatus are disclosed for retrieving a cable that has become stuck or wedged during the process of installation of the cable in an underground conduit. A projectile is sent down the opposite end of the conduit by pressurized air to engage a receiver attached to the leading edge of the stuck cable. After engagement of the projectile and the receiver the two are latched together. A retrieval line attached to the projectile can then be pulled from the open end of the conduit to free the wedged cable and extract the cable from the open end of the conduit.

11 Claims, 4 Drawing Sheets

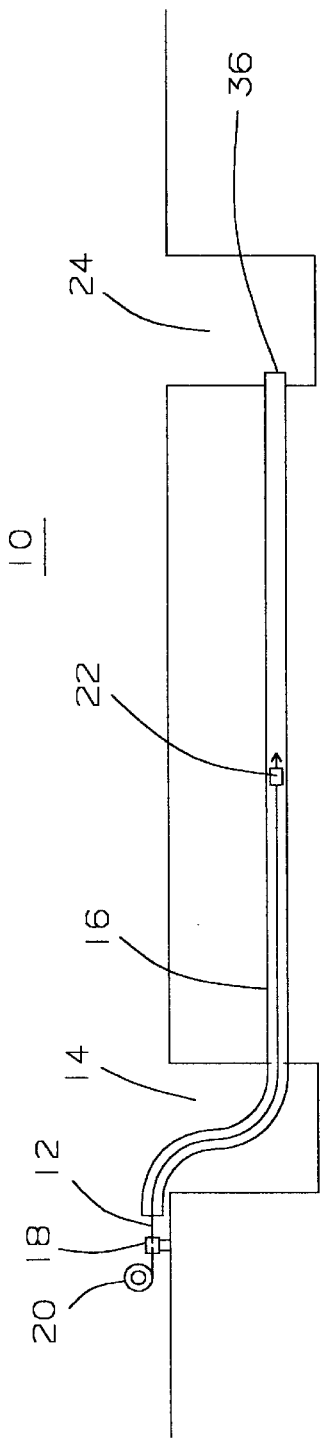
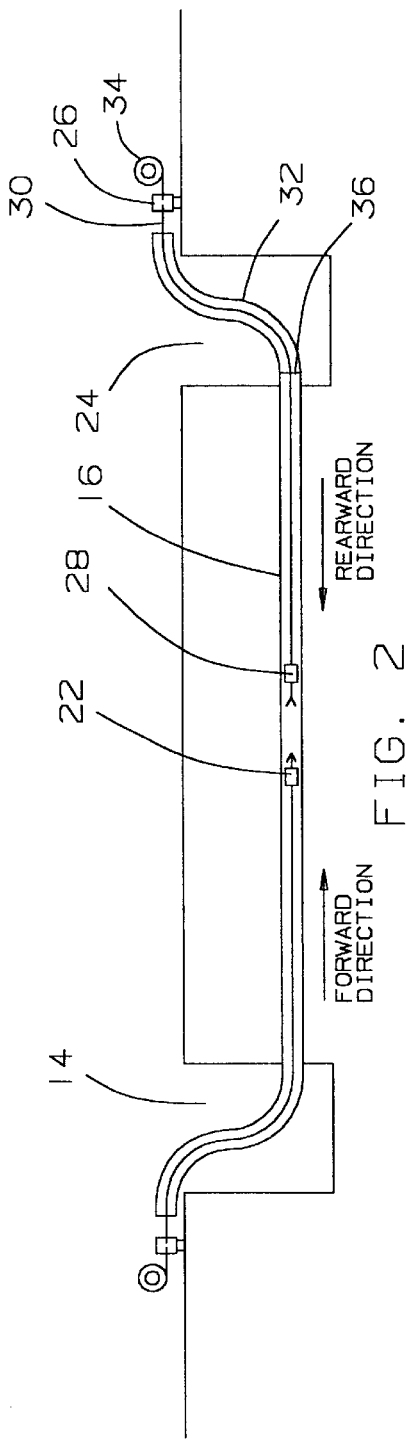

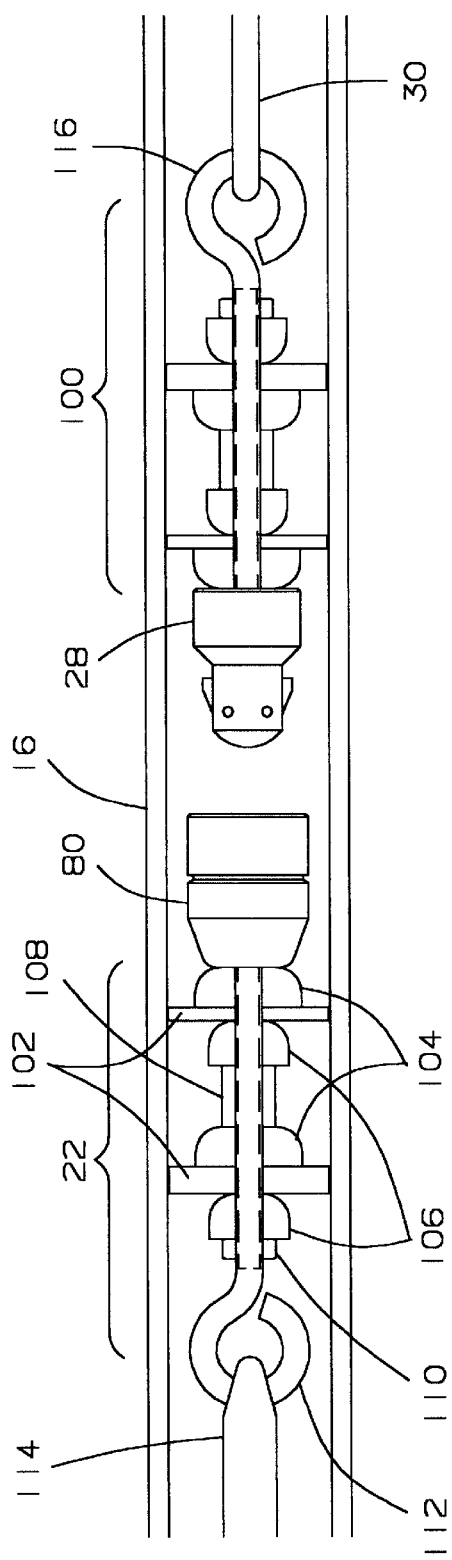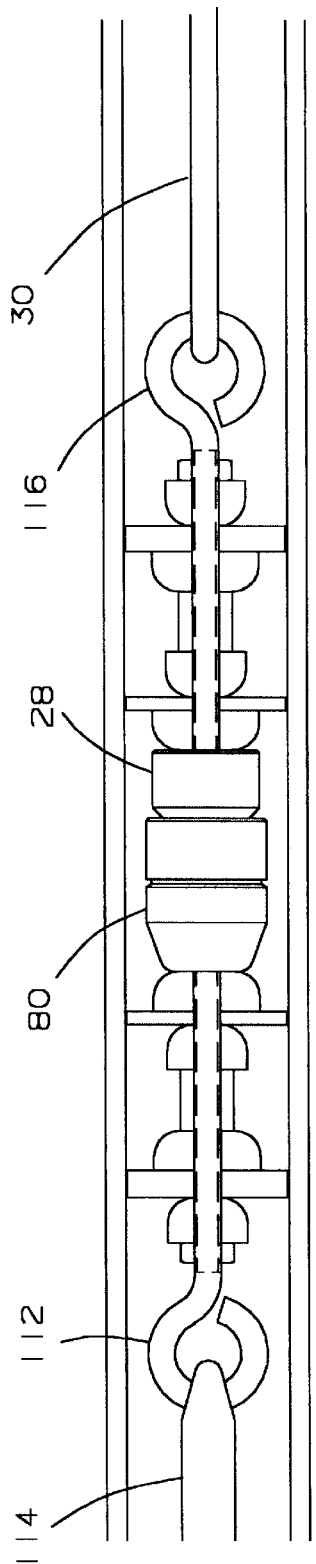

UNDERGROUND CABLE RETRIEVAL TOOL

BACKGROUND—CROSS-REFERENCE TO RELATED APPLICATION

This application claims the benefit of Provisional Patent Application No. 60/369,427 Filed Apr. 1, 2002, for *Underground Cable Retrieval Tool*.

BACKGROUND—FIELD OF INVENTION

This invention relates to retrieval of a fiber optic cable that has become wedged during installation in a conduit.

BACKGROUND—PRIOR ART

Fiber optic cables have become a preferred transmission system for telecommunication and data communication. These cables are generally installed underground inside a conduit. The conduit is often laid in trenches and can extend a mile or more. The conduit generally has a smooth inside diameter throughout its length. Several methods exist for installing the fiber optic cable into the conduit.

U.S. Pat. No. 4,836,503 (1989) to Giroux and U.S. Pat. No. 5,029,816 (1991) to Langston all relate to the installation of fiber optic cable in conduit. The methods described in these patents has to do with pulling the cable through the conduit. Intermediate devices are described in these patents so as to divide the required pull force into incremental quantities along the length of the conduit so as to not exceed the strength of the fiber optic cable. This requires excavation to access the conduit in the trench, splicing of the conduit, and the associated labor involved, at each intermediate station.

Another method of installing the fiber optic cable in the conduit is using air pressure and air flow (sometimes referred to as air blown fiber (ABF)). A seal(s) is installed at the leading edge shuttle of the fiber optic cable. The shuttle provides a seal between the fiber optic cable and the inside diameter of the conduit. The shuttle is sometimes referred to as "bird" or a "parachute". If the conduit is pressurized upstream of the shuttle, force is applied to the cable by the air pressure which causes the cable to move relative to the conduit, and hence, the cable is installed in the conduit.

Yet another installation method is provided by an apparatus for grasping the fiber optic cable and pushing it into the conduit. This is sometimes referred to as "jetting". This process is used in conjunction with the ABF process.

Thus the cable is pushed into and pulled through the conduit. This combination of cable installation techniques is in favored use.

One major concern, when using this push and pull method, is the remedy employed in the event that the shuttle and the trailing cable get wedged or stuck in the conduit. This can occur when there is too small a bend radius in the conduit, slightly deformed conduit, or just because the length of run is too long for the air blowing/ABF system. Radio transmitters have been designed to attach to the shuttle so that if the cable should get wedged or stuck in the conduit, the location of the shuttle can be determined by an appropriate signal locator. This remedy may be hampered by the location of adjacent utilities, such as gas, water, TV cable and electric wiring. The appropriate utility approvals must be obtained before any digging at the site can begin. Then, a trench must be opened, generally using a back hoe, to a depth of three to six feet. The conduit is then separated and the obstruction cleared. Sometimes the excavation site is then used to install an assist jetting machine and ABF to proceed with the installation of the fiber optic cable. The conduit is then repaired, and the trench back filled. Significant costs are associated with this remedy.

SUMMARY OF THE INVENTION

Accordingly, it is the object of the present invention to provide a simple, cost effective way to retrieve a fiber optic cable that has become wedged or stuck in a conduit during the installation process. The advantages are:

(a) no excavation of a trench is required to retrieve the stuck cable.

(b) the exact location of the cable shuttle that is wedged or stuck is not required.

(c) approval of the utilities is not required to open a trench.

(d) the manpower to perform the retrieval is minimal.

(e) heavy equipment for earth removal is not required.

Still further objects and advantages will become apparent from a consideration of the ensuing description.

In accordance with the present invention the retrieval method and mechanism comprises a projectile with an attached retrieval line, and a receiver attached to the shuttle of a fiber optic cable. If a shuttle becomes wedged in the conduit, the projectile is propelled by air pressure down the opposite end of the conduit and strikes the receiver. The projectile and receiver become latched together. Applying tension to the retrieval line serves to dislodge the shuttle and fiber optic cable from its wedged or stuck position.

BRIEF DESCRIPTION OF THE DRAWINGS

FIG. 1 shows a typical underground conduit and a cable partially installed.

FIG. 2 shows a retrieval of a wedged cable in process.

FIG. 8 shows views of a receiver and an approaching projectile in a conduit.

FIG. 9 shows a receiver and a connected projectile.

Figure 3:
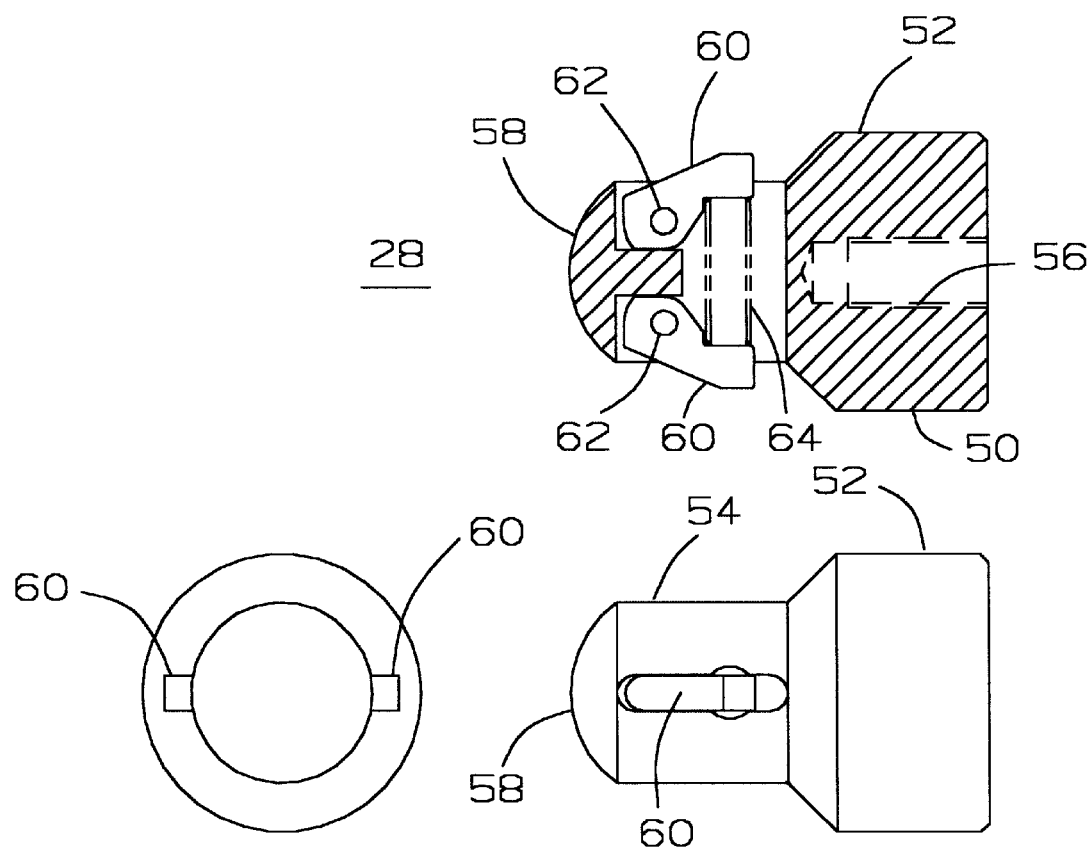
FIG. 3 shows orthogonal views of a projectile.

REFERENCE NUMBERS IN DRAWINGS 10 underground cable installation
12 cable
14 entrance manhole
16 conduit
18 jetting and air blowing mech.
20 cable reel
22 leading edge shuttle
24 exit manhole
26 air blowing apparatus
28 projectile
30 retrieval
32 temporary inlet tube
34 reel 106
36 open end
50 body
52 large cylinder
54 small cylinder 56 threaded hole
58 dome
60 lug
62 pin
64 spring
80 receiver
82 main body
84 threaded hole
86 aperture
88 threaded portion
90 end cap
92 aperture
94 flange
96 chamfer
100 retieval shutter
102 seal
104 large seal support
106 small seal support
108 spacer
110 nut
112 eye bolt
114 attachment member
116 eye bolt
120 tube

DETAILED DESCRIPTION OF THE INVENTION

FIG. 1 shows an underground cable installation 10 where a cable 12 is partially installed through a manhole 14 or other similar underground entrance. Cable 12 is fed through conduit 16 propelled in a forward direction by a combination jetting and air blowing mechanism 18. Cable 12 is typically stored on and fed from cable reel 20. Cable 12 can be a sheathed collection of fiber optic strands, or electric wires, or the like. At the leading edge of cable 12 is leading edge shuttle 22. Conduit 16 spans from entrance manhole 14 to exit manhole 24.

In FIG. 2, shuttle 22 has become stuck or wedged in an intermediate position between entrance manhole 14 and exit manhole 2. Air blowing apparatus 26 is temporarily provided at exit manhole 24 to propel projectile 28 through conduit 16, in route to receiver 22. Retrieval line 30 is attached to projectile 28 and may pass through a temporary inlet tube 32 that is provided to properly direct airflow into the open end 36 of conduit 16. This airflow propels projectile 28 and retrieval line 30 in a rearward direction toward receiver 22. A reel 34 may be provided to store the unused portion of retrieval line 30. Retrieval line 30 can be any type wire cable or rope suitable for pulling the wedged shuttle 22 and cable 12 through their obstruction and out the exit manhole 24.

In FIG. 3 projectile 28 is shown in three views. Body 50 consists a large cylinder 52 and a small cylinder 54. Centrally located in the end of large cylinder 52 is threaded hole 56. On the opposite end of body 50, spherical dome 58 projects from small cylinder 54. Two lugs 60 are installed in slots provided in small cylinder 54 and rotatably held by pins 62. Lugs 60 protrude beyond the diameter of small cylinder 62 and are urged into this position by spring 64. Lugs 60 are so designed to cooperate with the slots in small cylinder 54 so that, when urged against the force of spring 64, lugs 60 can be recessed with the confines of small cylinder 54.

Figure 4:
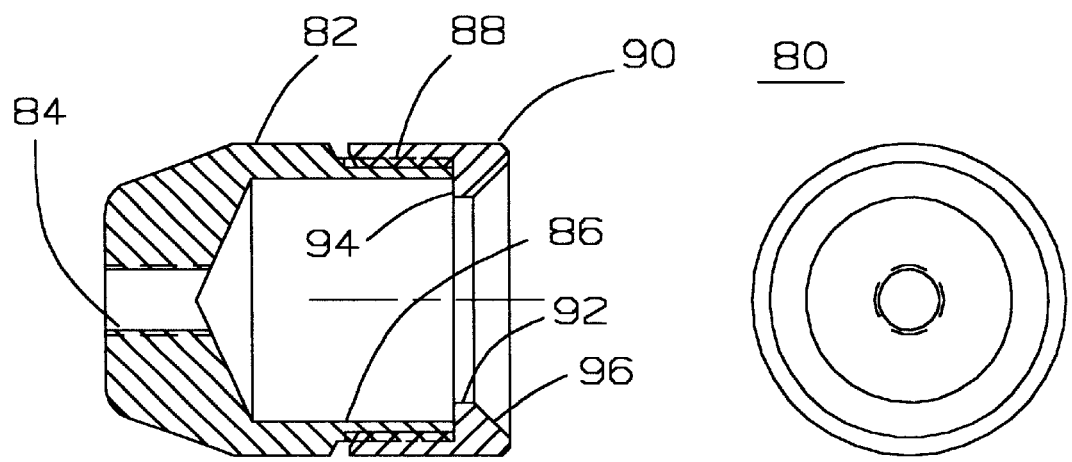
FIG. 4 shows two views of a receiver.

In FIG. 4, the two pieces of the receiver 80 are shown. Main body 82 contains a threaded hole 84 on one end. The other end has an aperture 86 of sufficient diameter to house small cylinder 54 (FIG. 3) with lugs 58 expanded. This end is also provided with an externally threaded portion 88 to accept a cooperating threaded portion of end cap 90. End cap 90 has an aperture 92 sufficient to allow passage of small cylinder 54 with lugs 60 retracted (FIG. 3). Aperture 92 forms the inside diameter of flange 94. A chamfer 96 is provided opposite the flange 94.

Figure 5:
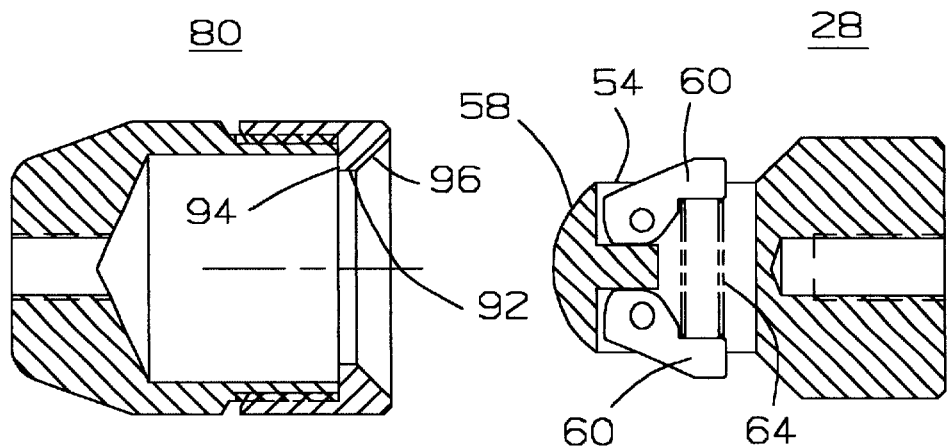
FIG. 5 shows a detailed cross-section of a receiver and an approaching projectile.
Figure 6:
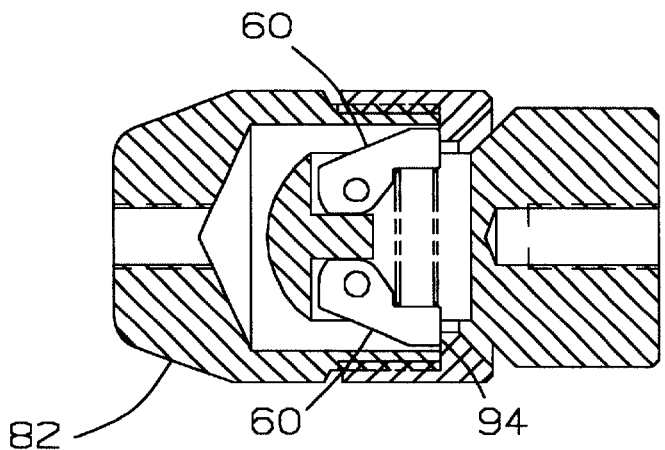
FIG. 6 shows a detailed cross-section of a receiver and a captured projectile.

FIG. 5 shows projectile 28 approaching receiver 80. Dome 58 and chamfer 96 cooperate to promote entry of projectile 28 into receiver 80. As lugs 60 pass through aperture 92 spring 64 is compressed and lugs 60 retract into small cylinder 54. Projectile 28 is fully engaged in receiver 80 in FIG. 6. Expanded lugs 60 now engage flange 94 and projectile 28 and receiver 80 are latched together.

Figure 7:
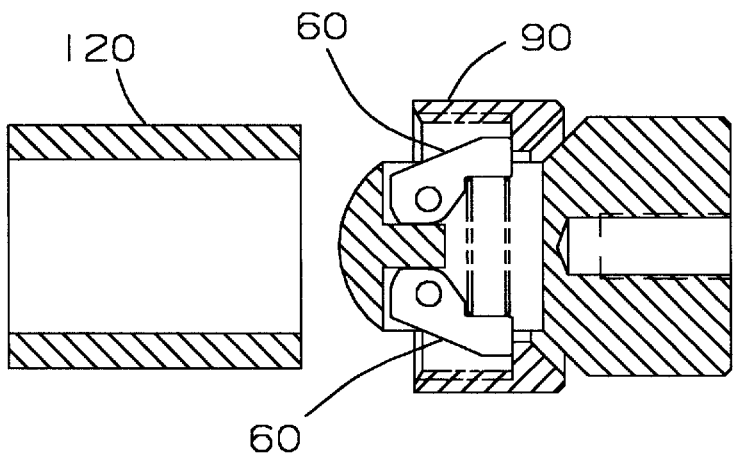
FIG. 7 shows a means for unlatching the projectile form the receiver.

FIG. 7 shows end cap 90 unthreaded and removed from main body 82, but with lugs 60 still latched to end cap 90. Tube 120 can be inserted in the end of end cap 90 which will depress lugs 60 into small cylinder 54 of projectile 28. This unlatches and allows removal of projectile 28 from end cap 90.

In FIG. 8, retrieval shuttle 100 is approaching leading edge shuttle 22 that has become wedged in conduit 16. Shuttle 22 consists of flexible seals 102, large seal supports 104, small seal supports 106, spacer 108, nut 110, and eye bolt 112. Eye bolt 112 is threaded into receiver 80 and nut 110 secures the components of shuttle 22 in a proper relationship to receiver 80.

Flexible seals 102 and seal supports 104 and 106 are designed to provide an adequate sealed resistance to air pressure when applied from one direction in conduit 16, but flex and allow air passage between the seals 102 and conduit 16 when air pressure is applied from the opposite direction. Seals 102 are spaced sufficiently apart to assure that receiver 80 is appropriately centered in conduit 80.

Attachment member 114 attaches cable 12 (not shown) to eyebolt 112.

Retrieval shuttle 100 is a mirror image of leading edge shuttle 22 and is attached to projectile 28. Retrieval line 30 is attached to eyebolt 116.

FIG. 9 shows projectile 28 engaged and latched to receiver 80.

Operation

If, during installation of cable 12, installation shuttle 22 and receiver 80 become wedged or stuck in conduit 16, a temporary retrieval system is set up at the nearest downstream access, such as manhole 24. Projectile 28 attached to shuttle 100 attached to retrieval line 30 is blown in a rearward direction by air pressure through the open end 36 of conduit 16 until projectile 28 latches by impact to receiver 80. Then, by pulling on retrieval line 30, sufficient force is exerted on the wedged shuttle 22 through retrieval line 30, shuttle 100 and the latched combination of projectile 28 and receiver 80 to clear any interference. Once the wedge is cleared, shuttle 22 can be drawn or blown to the exit manhole 24, and, if desired, the cable can again be jetted and air blown at entrance manhole 14 or exit manhole 24 toward the next destination.

Once the cable 12 has been retrieved, the projectile 28 and receiver 80 can be unlatched by unthreading end cap 90 from main body 82. This will expose lugs 60 of projectile 28 which can then be retracted inserting tube 120 (FIG. 7), allowing the projectile 28 to be withdrawn from end cap 90. End cap 90 can then be re-installed on main body 82 which makes the cable 12 ready for installation in the next span of conduit.

It is worthy of note that the positions of projectile 28 and receiver 80 can be exchanged and the system will still function properly.

Conclusion

The retrieval mechanism and method herein described is an effective alternative to existing methods of retrieval of a cable wedged or stuck in a conduit. It is extremely cost effective and simple to use and minimal manpower is required. It avoids having to know the exact location of the wedged cable shuttle. It avoids having to excavate the area where the wedged cable shuttle has been located. It avoids having to consult public utilities to identify any endangered systems near the excavation site and the associated length of time required to make that identity. It avoids having an idle crew while all of these processes take place. It avoids any necessity for the use of heavy earth removal equipment. It avoids having to part the conduit to relieve the interference and the subsequent repair of the parted conduit.

It will be appreciated that while particular embodiments of the invention have been shown and described, modifications may be made. For example, other methods of latching the projectile to the receiver can be made. It is intended in the claims to cover all modification which come within the true spirit and scope of the invention.

I claim:

1. An apparatus for retrieving a cable, stuck in a conduit, comprising:

a) a receiver attached to said cable, b) a projectile, and c) a retrieval line attached to said projectile, wherein said projectile is capable of being propelled, with said retrieval line, through the open end of said conduit until joining and locking to said receiver by impact force, whereby, by applying a pulling force to said retrieval line, a means is provided for dislodging stuck said cable an allowing the installation of said cable to continue, without the necessity of excavation to, and invasive entry into said conduit at the site of stuck said receiver.

2. The apparatus of claim 1 wherein said receiver and said projectile have cooperative means to facilitate engagement.

3. The apparatus of claim 1 wherein said receiver and said projectile have cooperative means to cause latching between said receiver and said projectile by impact force.

4. The apparatus of claim 1 wherein said projectile is connected to a shuttle, said shuttle having connected seals and spacers that provide means to be propelled by air pressure toward the stuck said receiver.

5. The apparatus of claim 1 wherein said projectile houses a plurality of lugs, retractable during engagement with said receiver and resiliently expandable after full engagement with said receiver to provide a latch between said projectile an said receiver.

6. The apparatus of claim 5 wherein said lugs are resiliently expanded by a helical compression spring.

7. The apparatus of claim 6 wherein, after said joining and said locking of said projectile and said receiver, an end cap can be uncoupled from said receiver thereby exposing said lugs of said projectile to means for unlatching said end cap from said projectile.

8. A method of retrieving a stuck cable from a conduit, including the steps of:

a) sending a receiver and said cable together in a forward direction in said conduit to a stuck position, b) sending a projectile and a retrieval line in a rearward direction in said conduit toward the said receiver until said projectile engages and locks into said receiver by impact force, and, c) pulling said retrieval line in a forward direction to free said cable from said stuck position, whereby allowing the continuation of the installation of said cable.

9. The method described in claim 8, including the further steps of attaching said receiver to the leading end of said cable prior to insertion of said cable in said conduit.

10. The method described in claim 8, wherein the step of sending said projectile in a rearward direction through said duct includes the further steps of:

a) attaching said projectile to a shuttle, b) attaching said shuttle to said retrieval line, c) inserting said shuttle and said projectile into said conduit, and d) introducing a flow of pressurized air into said conduit to propel said shuttle and projectile rearward in said conduit.

11. The method as described in claim 8, wherein said receiver and said projectile can be separated by an unlatching means.

* * * * *